United States Patent [19]

Miyazaki

[11] Patent Number: 5,408,401
[45] Date of Patent: Apr. 18, 1995

[54] POWER SOURCE CIRCUIT WITH A COMPACT SIZE AND OPERATING EFFICIENTLY AT LOW TEMPERATURE

[75] Inventor: Hiroshi Miyazaki, Yokohama, Japan

[73] Assignee: Kabushiki Kaisha Toshiba, Kawasaki, Japan

[21] Appl. No.: 784,316

[22] Filed: Oct. 30, 1991

[30] Foreign Application Priority Data

Oct. 31, 1990 [JP] Japan ................. 2-294268

[51] Int. Cl.6 .......................... H02M 3/335
[52] U.S. Cl. ........................ 363/21; 363/95; 363/97; 318/471; 388/934
[58] Field of Search ............ 318/471; 363/19, 21, 363/23, 25, 26, 95, 97, 131, 133, 134; 388/934

[56] References Cited

U.S. PATENT DOCUMENTS

| 4,061,949 | 12/1977 | Griffis | 318/471 |
|---|---|---|---|
| 4,334,263 | 6/1892 | Adachi | 363/25 |
| 4,438,411 | 3/1984 | Rubin et al. | 363/21 |
| 4,574,226 | 3/1986 | Binder | 318/317 |
| 4,611,682 | 9/1986 | Yasuda et al. | 318/473 |
| 4,654,573 | 3/1987 | Rough et al. | 363/18 |
| 4,667,480 | 5/1987 | Bessler | 318/332 |
| 4,764,652 | 8/1988 | Lee | 363/97 |
| 4,777,575 | 10/1988 | Yamato et al. | 363/21 |
| 5,021,620 | 6/1991 | Inumada | 363/97 |
| 5,038,088 | 8/1991 | Arends et al. | 388/934 |
| 5,068,777 | 11/1991 | Ito | 363/97 |

FOREIGN PATENT DOCUMENTS

| 57-009257 | 1/1982 | Japan | H02M 3/06 |
|---|---|---|---|
| 61-199466 | 9/1986 | Japan | H02M 3/28 |
| 1-019966 | 1/1989 | Japan | H02M 3/28 |
| 62-193803 | 6/1989 | Japan | H02P 6/02 |
| 1-227664 | 9/1989 | Japan | H02M 7/48 |

Primary Examiner—Jeffrey L. Sterrett
Attorney, Agent, or Firm—Foley & Lardner

[57] ABSTRACT

A power source circuit converts direct current (DC) power into alternating current (AC) power having a required frequency, and provides DC output power according to the AC power. The power source circuit comprises an oscillator for providing a control signal that determines a converting frequency of the AC power; an element provided for the oscillator, having temperature characteristics for increasing the converting frequency at a low temperature; and a device for determining the converting frequency of the AC power according to the control signal provided by the oscillator.

19 Claims, 5 Drawing Sheets

POWER SOURCE CIRCUIT WITH A COMPACT SIZE AND OPERATING EFFICIENTLY AT LOW TEMPERATURE

BACKGROUND OF THE INVENTION

1. Field of the Invention

The present invention relates to a switching power source circuit and to a motor driving circuit employing the switching power source circuit.

2. Description of the Prior Art

Various switching power source circuits have been proposed in recent years. The switching power source circuits are applicable for driving loads such as motors.

Usually, lubrication of moving portions of a motor gradually deteriorates to increase friction in the moving portions as an ambient temperature falls, to thereby increase a load on a power source circuit that drives the motor. The power source circuit, therefore, must have a margin for allowing a 30% to 50% increase in the load applied to the circuit at a temperature of about −20 degrees centigrade.

An example of a conventional switching power source circuit will be explained with reference to FIG. 1.

The power source circuit 100 has a line filter 101 for removing noise from alternating current (AC) source power to the circuit 100. The noise-removed AC source power is rectified through a rectifier circuit 103 and smoothed by a capacitor C1. The smoothed direct current (DC) source power is supplied to a control circuit 105 through an activation resistor R1 and to primary windings TR1a and TR1b of a converter transformer (hereinafter referred to as the transformer) TR1.

An output voltage of a secondary winding TR1c of the transformer TR1 is supplied to a voltage limit circuit 107 through rectifying diodes D1 and D3, a choke coil CH1, and a smoothing capacitor C3. The voltage limit circuit 107 detects the output voltage of the secondary winding TR1c of the transformer TR1, and if the detected voltage has reached a limit value, provides a detection signal to the control circuit 105.

A current limit circuit 109 receives a terminal voltage of a resistor R3 to detect an output current of the secondary winding TR1c of the transformer TR1. If the detected current has reached a limit value, the current limit circuit 109 provides a detection signal to the control circuit 105.

A current limit circuit 111 detects a current on the primary side of the transformer TR1. Namely, the current limit circuit 111 receives a terminal voltage of a resistor R5 to detect the current on the primary side of the transformer TR1. If the detected current has reached a limit value, the current limit circuit 111 provides a detection signal to the control circuit 105.

After receiving the detection signal from any one of the voltage limit circuit 107 and current limit circuits 109 and 111, the control circuit 105 turns OFF a transistor Tr1, thereby limiting the output of the transformer TR1.

The control circuit 105 comprises an oscillation circuit 119 and a PWM controller 121. The oscillation circuit 119 has, as oscillation frequency defining elements, a resistor 115 and a capacitor 117.

A signal having an oscillation frequency determined by the resistor 115 and capacitor 117 turns ON and OFF the transistor Tr1 through the PWM controller 121. As a result, the DC source power is periodically switched and converted into high-frequency AC power. In this way, the resistor 115 and capacitor 117 determine the converting frequency of the switching power source circuit.

The detection signals provided by the voltage limit circuit 107 and current limit circuit 109 according to the DC output voltage and current are sent to the PWM controller 121 of the control circuit 105, which widens an ON pulse width of the transistor Tr1 when the output voltage and current drop, and narrows the ON pulse width of the transistor Tr1 when the output voltage and current rise, thereby maintaining a constant output.

The maximum transmission power of the power source circuit depends on the capacity of the transformer TR1. With the same capacity, the transformer TR1 can transmit larger power if the converting frequency is increased. There is a limit, however, on the converting frequency because the transformer TR1 and transistor Tr1 generate more heat as the converting frequency rises.

Generally, the maximum output power of the conventional power source circuit has no temperature dependency. The power source circuit, therefore, is designed based on a most critical operation condition, i.e., an expected maximum ambient temperature (about 60 to 80 degrees centigrade). Accordingly, the power source circuit has a margin when operated at an ordinary ambient temperature (about 20 to 30 degrees centigrade).

Generally, the converting efficiency of the switching power source circuit increases as its output increases, and at the maximum output, the converting efficiency reaches the maximum. This means that the power source circuit having a large maximum output margin usually operates at low converting efficiency.

As explained above, the conventional power source circuit for driving a load such as a motor having movable portions (frictional portions) must be designed to provide a 30% to 50% larger output at a low temperature compared with an output at an ordinary temperature. This increases the size of the transformer TR1 and transistor Tr1, thereby increasing the cost of the power source circuit. In addition, the conventional power source circuit operates at low converting efficiency at the ordinary temperature because an output at the ordinary temperature is designed to be lower than that at the low temperature.

SUMMARY OF THE INVENTION

To solve the problems of the prior art, an object of the invention is to provide a power source circuit that is compact and achieves high converting efficiency with output characteristics following the temperature characteristics of a load, and to provide a driving circuit employing the power source circuit.

Another object of the invention is to provide a power source circuit that properly-limits, even at a low temperature, an output voltage or an output current according to the characteristics of a load.

In order to accomplish the objects, a first aspect of the invention provides a power source circuit for converting DC power into AC power having a predetermined frequency, and providing DC output power according to the AC power. The power source circuit has an oscillation circuit for generating a control signal that determines a converting frequency of the AC power. The oscillation circuit has an element having temperature dependency to increase the converting frequency at a low temperature.

This arrangement increases the converting frequency at a low temperature, thereby increasing the maximum output of the power source circuit and eliminating a special margin, which is conventionally provided for an ordinary-temperature operation because the load of a motor, etc., driven by the power source circuit increases as an ambient temperature drops. As a result, the power source circuit of the invention can employ a small transformer and switching transistor, to reduce overall dimensions. Heat to be generated due to an increase in the converting frequency causes no problem because the converting frequency is increased when an ambient temperature is low. The power source circuit of the invention always operates at around the maximum output to improve converting efficiency.

A second aspect of the invention provides a driving circuit for converting DC power into AC power having a predetermined frequency, and according to the AC power, providing a DC output for driving a motor. This driving circuit has an oscillation circuit for generating a control signal that determines a converting frequency of the AC power. The oscillation circuit has an element having temperature dependency to increase the converting frequency at a low temperature.

When the load of a motor driven by the driving circuit increases as an ambient temperature falls, the driving circuit increases the converting frequency to increase the output thereof. In this way, the output characteristics of the driving circuit properly follow the temperature characteristics of the motor load.

A third aspect of the invention provides a power source circuit for driving a load having temperature dependency and limiting power supplied to the load according to a detected value. The power source circuit comprises output current detection means having temperature dependency in detecting an output current supplied to the load. The output current detection means temperature-dependently detects the output current, and the power source circuit limits the electric power supplied to the load in response to the detected current. Namely, the power source circuit properly temperature-dependently limits the electric power supplied to the load, in response to the temperature-dependently detected output current.

A fourth aspect of the invention provides a power source circuit for driving a load having temperature dependency and limiting electric power supplied to the load in response to a detected value. The power source circuit comprises output voltage detection means for temperature-dependently detecting an output voltage supplied to the load. The output voltage detection means temperature-dependently detects the output voltage, and according to the detected voltage, the power source circuit limits electric power supplied to the load. In this way, the power source circuit properly temperature-dependently limits the electric power supplied to the load, in response to the temperature-dependently detected output voltage.

A fifth aspect of the invention provides a power source circuit for driving a load having temperature dependency with electric power provided through a transformer and limiting the electric power supplied to the load in response to a detected value. The power source circuit comprises input current detection means for temperature-dependently detecting an input current supplied to the transformer. According to the temperature-dependently detected input current, the power source circuit limits the electric power supplied to the load. In this way, the power source circuit properly temperature-dependently limits the electric power supplied to the load, according to the temperature-dependently detected input current.

A sixth aspect of the invention provides a power source circuit for driving a load having temperature dependency by electric power supplied through a transformer and limiting the electric power supplied to the load according to a detected value. The power source circuit comprises at least two among output current detection means for temperature-dependently detecting an output current supplied to the load, output voltage detection means for temperature-dependently detecting an output voltage supplied to the load, and input current detection means for temperature-dependently detecting an input current supplied to the power source circuit. The power source circuit limits the electric power supplied to the load according to the values detected by the detection means. In this way, the power source circuit properly temperature-dependently limits the electric power supplied to the load.

These and other objects, features an advantages of the present invention will be more apparent from the following detailed description of preferred embodiments in conjunction with the accompanying drawings.

DETAILED DESCRIPTION OF THE EMBODIMENTS

Figure 1:
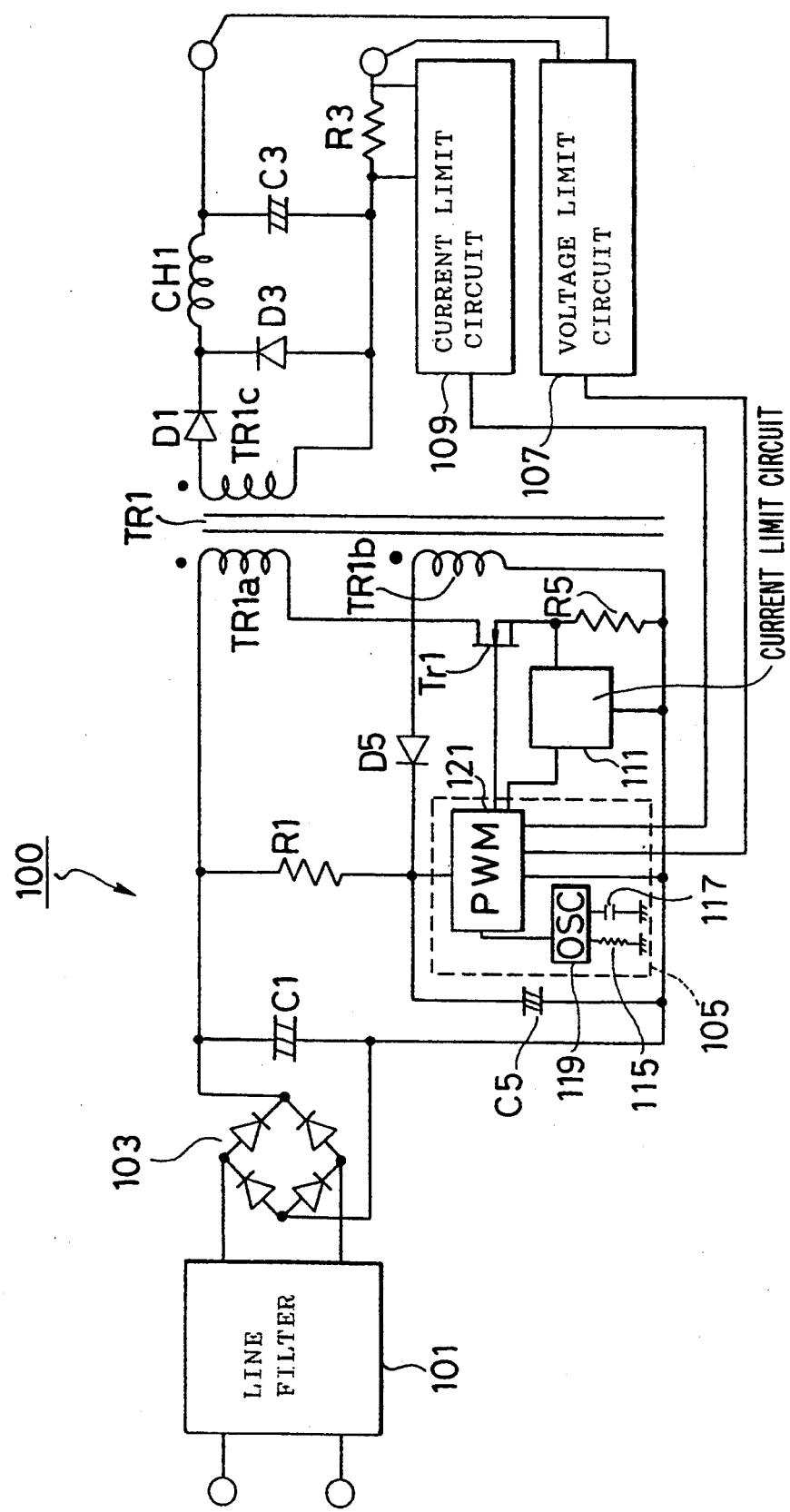
FIG. 1 is a circuit diagram showing a switching power source circuit according to a prior art.
Figure 2:
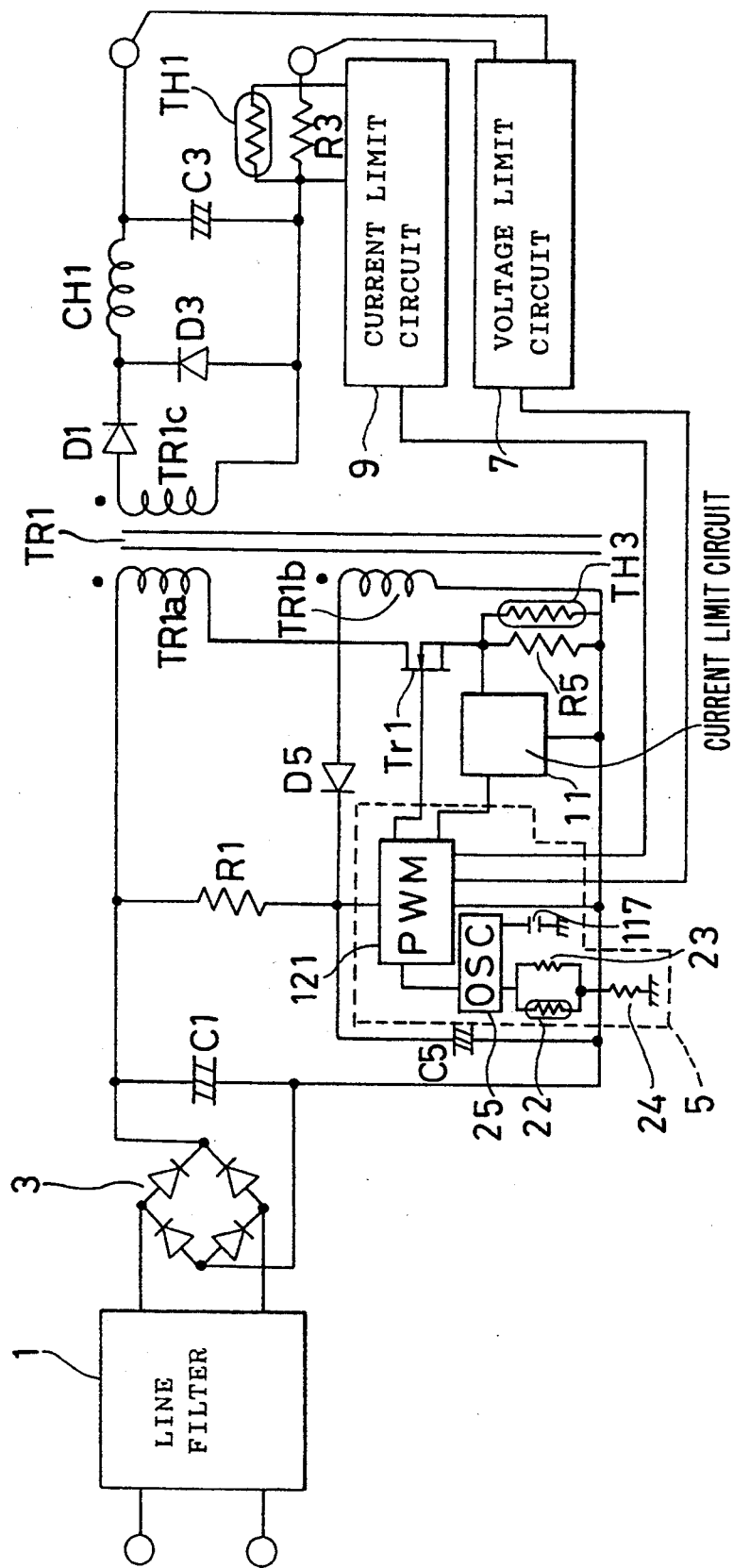
FIG. 2 is a circuit diagram showing a switching power source circuit according to an embodiment of the invention;.

FIG. 2 is a circuit diagram showing a power source circuit according to an embodiment of the invention applied for a separately excited forward converter.

A line filter 1 removes noise from AC source power. A rectifier circuit 3 comprises rectifying diodes, etc., for rectifying the AC power supplied through the line filter 1. A capacitor C1 smooths DC electric power provided by the rectifier circuit 3. The smoothed DC power provided by the capacitor C1 is supplied to a control circuit 5 through an activation resistor R1 and to primary windings TR1a and TR1b of a transformer TR1. A reset circuit and a surge absorbing circuit of the transformer TR1 are not shown.

An output voltage from a secondary winding TR1c of the transformer TR1 is supplied to a voltage limit circuit 7 through rectifying diodes D1 and D3, a choke coil CH1, and a smoothing capacitor C3. The voltage limit circuit 7 has a predetermined limit value. The voltage limit circuit 7 detects the output voltage of the secondary winding TR1c of the transformer R1, and if the detected voltage has reached the limit value, provides a detection signal to the control circuit 5.

A power source line from the secondary winding TR1c of the transformer TR1 is connected to a resistor R3, which is connected in parallel with a thermistor TH1. The resistor R3 and thermistor TH1 form output current detection means for temperature-dependently detecting an output current of the secondary winding TR1c. The thermistor TH1 has nonlinear positive temperature characteristics, so that, when an ambient temperature falls, a combined resistance of the resistor R3 and thermistor TH1 drops to decrease a terminal voltage of the resistor R3 to be detected.

A current limit circuit 9 is connected to both ends of the resistor R3 and receives a voltage produced by the combined resistance of the resistor R3 and thermistor TH1. The current limit circuit 9 detects the output current of the secondary Winding TR1c of the transformer TR1 according to the terminal voltage of the resistor R3, and if the detected current has reached a limit value stored in the current limit circuit 9, provides a detection signal to the control circuit 5.

A current limit circuit 11 detects a current on the primary side of the transformer TR1. The primary winding TR1a of the transformer TR1 is connected in series to a transistor Tr1 such as a bipolar transistor and a resistor R5. The resistor R5 is connected in parallel with a thermistor TH3. The resistor R5 and thermistor TH3 form input current detection means for temperature-dependently detecting the input current to the transformer TR1. The thermistor TH3 has nonlinear positive temperature characteristics so that a combined resistance of the resistor R5 and thermistor TH3 decreases as an ambient temperature drops, to reduce a terminal voltage of the resistor R5 to be detected.

The current limit circuit 11 is connected to both ends of the resistor R5 and receives the voltage produced by the combined resistance of the resistor R5 and thermistor TH3. The current limit circuit 11 stores a predetermined limit value. The current limit circuit 11 detects a current on the primary side of the transformer TR1 according to the terminal voltage of the resistor R5, and if the detected value has reached the limit value, provides a detection signal to the control circuit 5.

The control circuit 5 has an oscillation circuit 25 having an element that has temperature characteristics for increasing an oscillation frequency, i.e.., a converting frequency when an ambient temperature is low. The element having the temperature characteristics is a temperature sensor 22 made of a platinum temperature detector or a thermistor.

The resistor portion for defining the oscillation frequency of the oscillation circuit 25, comprises two resistors 23 and 24 connected in series, and the temperature sensor 22 connected in parallel with the resistor 23. The resistor portion may be properly modified. For example, the two fixed resistors 23 and 24 may be omitted.

If the temperature sensor 22 is a platinum temperature detecting resistor, the converting frequency may have continuous temperature dependency to raise the converting frequency as an ambient temperature drops.

Figure 3:
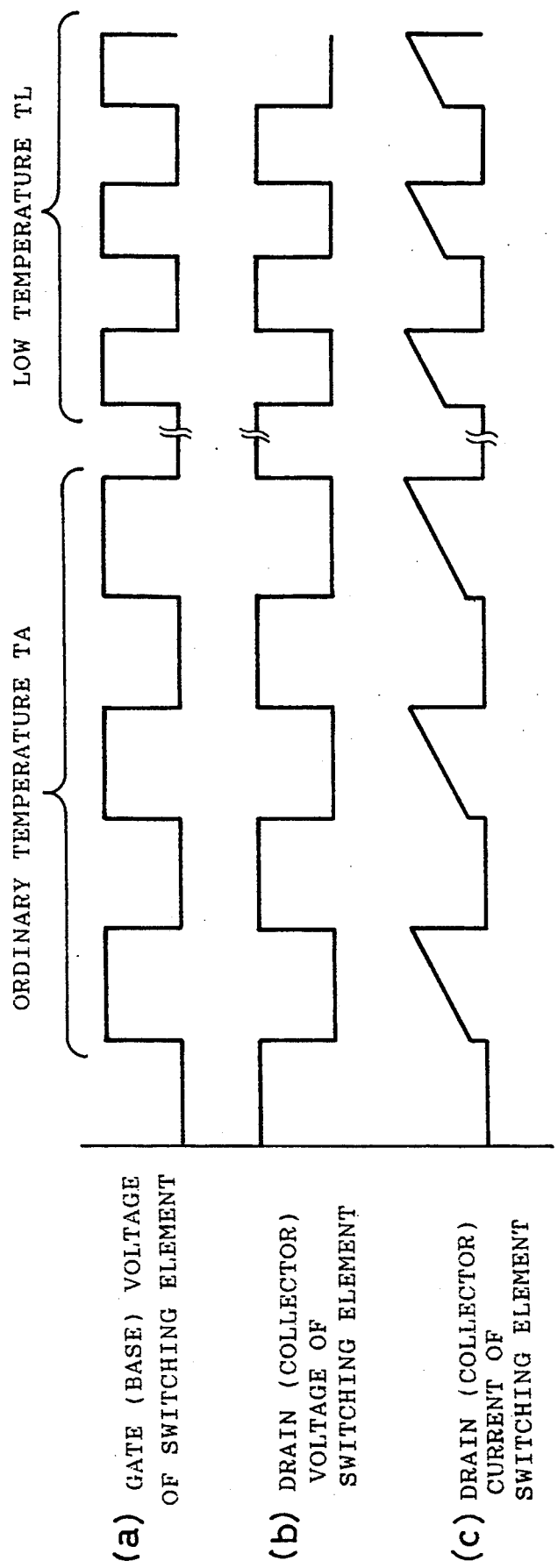
FIG. 3 shows waveforms during the ordinary and low temperature operations of a transistor Tr1 of the embodiment of FIG. 2.

FIG. 3 shows waveforms of the transistor Tr1 operating at an ordinary temperature TA and a low temperature TL. A pulse period at the low temperature TL is shorter than that at the ordinary temperature TA. Accordingly, a period of a current flowing to the coil of the transformer TR1, i.e., a period for exiting the transformer TR1 becomes shorter under the low temperature. As a result, a core of the transformer TR1 does not to saturate, thereby increasing electric power transmitted through the transformer TR1. At this time, the transistor Tr1 and transformer TR1 generate more heat. The ambient temperature, however, is low in this occasion so that the temperatures of the transistor Tr1 and transformer TR1 are suppressed to cause no problem due to the generated heat.

Figure 4:
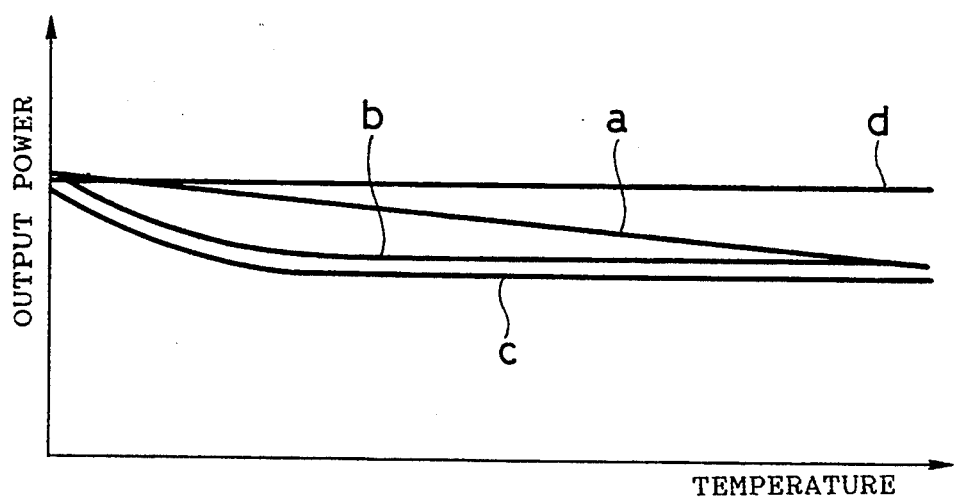
FIG. 4 is a view showing temperature-maximum output characteristic curves of the power source circuits of the invention and prior art.

FIG. 4 shows temperature-output power characteristic curves of the embodiment and prior art. A characteristic curve "a" is of the power source circuit according to the embodiment, in which the maximum output gradually increases as the temperature decreases. This is convenient in driving a load that gradually increases as the temperature decreases.

The temperature sensor 22 may be a PTC thermistor having switching characteristics for changing the converting frequency when the temperature falls below a predetermined value. A fixed resistor may be connected to the PTC thermistor in series or in parallel, to adjust a rate of increase of the converting frequency. Similar to the platinum temperature detector, the PTC thermistor provides the transistor Tr1 with operation waveforms shown in FIG. 3 for the ordinary temperature TA and low temperature TL.

The effect of the PTC thermistor is the same as that of the platinum temperature detector. Namely, the transformer TR1 is provided with a margin in saturation at the low temperature TL, to transmit more power. At this time, the transistor Tr1 and transformer TR1 produce more heat. The temperatures thereof are suppressed, however, because the ambient temperature is low in this occasion. No problem occurs, therefore, due to the generated heat.

The power source circuit having the PTC thermistor demonstrates a temperature-maximum output characteristic curve "b" of FIG. 4. This is proper for a load such as a motor load that suddenly increases as the temperature falls as indicated with a curve "c" of FIG. 4.

In FIG. 4, a characteristic curve "d" represents the conventional power source circuit as a comparison.

Various temperature sensors may be used individually or combined together to realize power source circuits that more properly follow the temperature characteristics of various loads. It is possible to use a comparator to change the coverting frequency of a power source circuit at a temperature exceeding a predetermined value.

Figure 5:
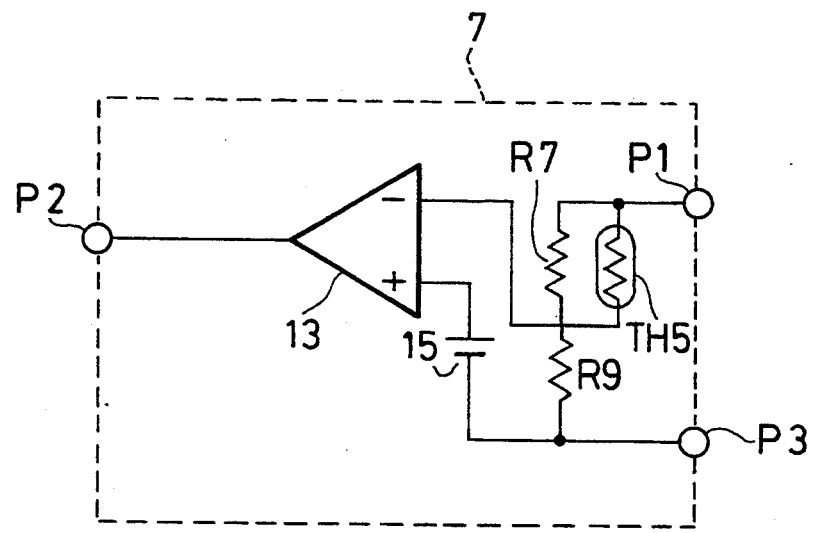
FIG. 5 is a circuit diagram showing an internal arrangement of a voltage limit circuit of the embodiment of FIG. 2.

FIG. 5 shows an internal arrangement of the voltage limit circuit 7 of FIG. 2.

Resistors R7 and R9 are connected in series between terminals P1 and P3. The resistors R7 and R9 and a thermistor TH5 form output voltage detection means for temperature-dependently detecting an output voltage of the transformer TR1. The thermistor TH5 has nonlinear negative temperature characteristics, so that a voltage dividing ratio of the resistors R7 and R9 becomes larger as an ambient temperature decreases, to reduce a terminal voltage of the resistor R9 to be detected.

A node between the resistors R7 and R9 is connected to one input terminal of a comparator 13. The terminal P3 is connected to the resistor R9 as well as to another input terminal of the comparator 13 through a voltage source 15. An output terminal of the comparator 13 is connected to the control circuit 5 through a terminal P2. The comparator 13 provides a detection signal to the control circuit 5 when the detected voltage has reached the limit value.

Figure 6:
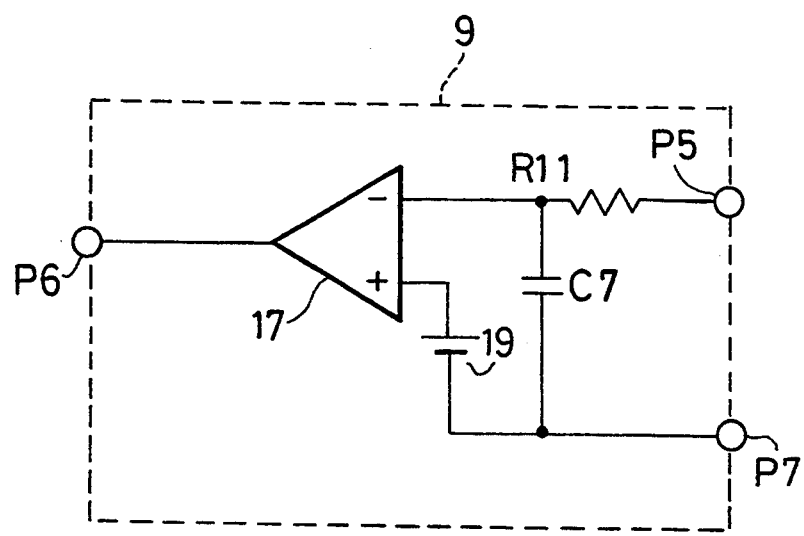
FIG. 6 is a circuit diagram showing an internal arrangement of a current limit circuit of the embodiment of FIG. 2.

FIG. 6 shows an internal arrangement of the current limit circuit 9.

Terminals 5 and 7 are connected to the resistor R3, to receive a value detected by the resistor R3. Through a resistor R11, the terminal P5 is connected to a capacitor C7 and to one input terminal of a comparator 17. The terminal P7 is connected to the capacitor C7 as well as to another input terminal of the comparator 17 through a voltage source 19. The resistor R11 and capacitor C7 form a low-pass filter to remove noise from the value detected by the resistor R3.

An output terminal of the comparator 17 is connected to the control circuit 5 through a terminal P6. The comparator 17 provides a detection signal to the control circuit 5 when the detected value has reached the limit value.

An internal arrangement of the current limit circuit 11 is identical with that of the current limit circuit 9 shown in FIG. 6.

An operation of the voltage limit circuit 7 for an ordinary temperature and a high temperature will be explained.

The voltage limit circuit 7 receives an output voltage of the transformer TR1 through the terminals P1 and P3. The output voltage of the transformer TR1 is divided by a combined resistance of the resistor R7 and thermistor TH5 and a resistance of the resistor R9. A terminal voltage of the resistor R9 is provided as a detected value to the one input terminal of the comparator 13. When the detected value reaches the limit value provided by the voltage source 15, the comparator 13 provides a detection signal to the control circuit 5. The control circuit 5 then turns OFF the transistor Tr1, thereby limiting the output of the transformer TR1.

An operation of the voltage limit circuit 7 for a low temperature will be explained.

The thermistor TH5 has nonlinear negative temperature characteristics so that a voltage dividing ratio of the resistors R7 and R9 increases as the temperature decreases, thereby reducing the terminal voltage of the resistor R9 to be detected.

Unlike the straight line "d" of FIG. 4 representing the voltage limit characteristics of the conventional power source circuit which are constant even if the temperature decreases, the voltage limit characteristic curve "b" of FIG. 4 of the embodiment rises as the temperature decreases. Namely, the voltage limit characteristics of the embodiment change according to the maximum output characteristic curve "c" of FIG. 4 of the load driven by the power source circuit of the embodiment. In this way, the output of the power source circuit of the embodiment is properly limited in a range of from high to low working temperatures.

Operations of the current limit circuits 9 and 11 will be explained. Since the circuits 9 and 11 are identical with each other, the operation of only the circuit 9 will be explained.

Firstly, an operation of the current limit circuit 9 for an ordinary temperature and a high temperature will be explained.

When receiving a value detected by the resistor R3, the comparator 17 compares the detected value with the limit value provided by the voltage source 19. If the detected value has reached the limit value, the comparator 17 provides a detection signal to the control circuit 5, which then turns OFF the transistor Tr1 to limit the output of the transformer TR1.

Next, an operation of the current limit circuit 9 for a low temperature will be explained.

Since the thermistor TH1 has nonlinear positive temperature characteristics, a combined resistance of the resistor R3 and thermistor TH1 decreases as the temperature decreases, to reduce the terminal voltage of the resistor R3 to be detected. As a result, as indicated with the curve "b" of FIG. 4, the limit characteristics of the control circuit 5 rise as the temperature decreases. Namely, the limit characteristics of the embodiment are changed according to the maximum output characteristic curve "c" of FIG. 4 of the load driven by the embodiment. In this way, the output of the power source circuit is properly limited in a range of from high to low working temperatures.

Another embodiment of the invention will be explained with reference to FIG. 7. This embodiment basically employs the same arrangements as those shown in FIGS. 2, 5, and 6.

Figure 7:
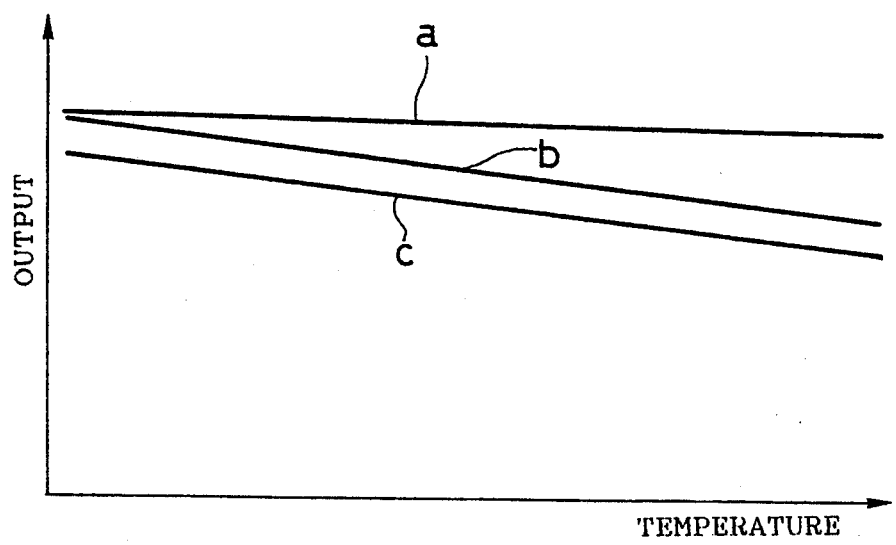
FIG. 7 is a view showing temperature-output characteristic curves of the power source circuits of another embodiment of the invention and the prior art.

A line "c" of FIG. 7 represents the maximum output characteristics of this embodiment, which linearly increase as an ambient temperature falls. Instead of the thermistors TH1 and TH3, the embodiment employs, for example, platinum temperature detectors having linear positive temperature characteristics for detecting an output current and an input current, and instead of the thermistor TH5, a platinum temperature detector for detecting an output voltage.

A combined resistance of the resistor R3 and platinum temperature detector (substituting for the thermistor TH1) or a combined resistance of the resistor R5 and platinum temperature detector (substituting for the thermistor TH3) decreases as the temperature drops, because the platinum temperature detectors have linear temperature characteristics. As a result, terminal voltages of the resistors R3 and R5 to be detected drop.

The platinum temperature detector substituting for the thermistor TH5 increases a voltage dividing ratio of the resistors R7 and R9 as the temperature decreases, so that a terminal voltage of the resistor R9 to be detected becomes smaller.

Unlike the conventional limit characteristics indicated with a straight line "a" in FIG. 7, the limit characteristics of this embodiment linearly increase as the temperature falls, as indicated with the curve "b" in FIG. 7. Namely, the limit characteristics of the embodiment linearly change according to a maximum output characteristic curve "c" of FIG. 7 of a load driven by the embodiment. In this way, the output of the embodiment is properly limited in a range of from high to low working temperatures.

Still another embodiment of the invention will be explained. This embodiment basically employs the same arrangements as those shown in FIGS. 2, 5, and 6.

This embodiment provides temperature dependency for each of the voltage sources 15 and 19. Namely, the voltage sources 15 and 19 act as limit value generating means having temperature dependency. For example, any one of the voltage sources 15 and 19 may generate a voltage by using temperature characteristics of a semiconductor element, e.g., a forward voltage of a diode, etc. As a result, a limit value having temperature dependency is generated to limit an output voltage or an output current of the power source circuit.

When the voltage sources 15 and 19 have nonlinear temperature characteristics so that each limit value may nonlinearly increase as the temperature falls, the limit characteristic curve of this embodiment will be "b" of FIG. 4. Namely, the limit characteristics of the embodiment may be changed according to the maximum output characteristic curve "c" of FIG. 4 of a load driven by the embodiment. In this way, the output of the embodiment is properly limited in a range of from high to low temperatures.

When the voltage sources 15 and 19 have linear temperature characteristics so that each limit value may linearly increase as the temperature falls, the limit characteristic curve of this embodiment will be "b" of FIG. 7. Namely, the limit characteristics of the embodiment may be changed according to the maximum output characteristic curve "c" of FIG. 7 of a load driven by the embodiment. In this way, the output of the embodiment is properly limited in a range of from high to low temperatures.

Instead of the comparators 13 and 17, an operational amplifier and a feedback resistor may be employed. The feedback resistor is made of a thermistor or a platinum temperature detector having nonlinear or linear temperature characteristics. This arrangement can also increase limit characteristics as the temperature falls, as indicated with the curve "b" of FIG. 4 or the curve "b" of FIG. 7.

The embodiments have been explained with reference to the externally excited forward converter. This invention is also applicable for any other externally excited conversion techniques such as flyback converters, to achieve the same actions and effects. The invention is also applicable for chopper DC-DC converters, to provide the same actions and effects. Instead of the PWM control technique, a frequency control technique may be employed to change a converting frequency according to an ambient temperature and to provide output power having temperature dependency.

In summary, a power source circuit according to the invention increases a converting frequency at a low temperature, thereby increasing an output at the low temperature and eliminating a special margin, which must be otherwise provided for an output at an ordinary temperature to deal with a load that increases as the temperature drops. The power source circuit, therefore, can employ compact components to reduce the size thereof. The power source circuit can be always operated around the maximum output to improve converting efficiency.

Secondly, the invention increases a converting frequency and an output according to a decrease in temperature when driving a motor whose load increases according to a decrease in temperature, so that output characteristics may properly follow the temperature characteristics of the motor load.

Thirdly, the invention temperature-dependently detects an output current through output current detection means, and limits electric power supplied to a load according to the detected value. Namely, the electric power supplied to the load is properly temperature-dependently limited according to the temperature-dependently detected output current.

Fourthly, the invention temperature-dependently detects an output voltage through output voltage detection means, and limits electric power supplied to a load according to the detected value. Namely, the electric power supplied to the load is properly temperature-dependently limited according to the temperature-dependently detected output voltage.

Fifthly, the invention temperature-dependently detects an input current through input current detection means, and limits electric power supplied to a load according to the detected value. Namely, the electric power supplied to the load is properly temperature-dependently limited according to the temperature-dependently detected input current.

Sixthly, the invention temperature-dependently detects an output current through output current detection means, an output voltage through output voltage detection means, or an input current through input current detection means, and limits electric power supplied to a load according to the detected value. Namely, the electric power supplied to the load is properly temperature-dependently limited according to the temperature-dependently detected output current, output voltage, or input current.

Various modifications will become possible for those skilled in the art after receiving the teachings of the present disclosure without departing from the scope thereof.

What is claimed is:

1. A power source circuit for converting direct current (DC) power into alternating current (AC) power having a required frequency and providing DC output power according to the AC power for use upon a change of ambient temperature, comprising:
   oscillation means for providing a control signal that determines a converting frequency of the AC power;
   sensing means for said oscillation means, having temperature characteristics for increasing the converting frequency upon changing of ambient temperature;
   determination means for determining the converting frequency of the AC power based on said control signal provided by said oscillation means;
   a transformer coupled to said determination means; and
   DC output detection means, including a temperature sensor, for temperature-dependently detecting the DC output power.

2. The power source circuit according to claim 1, wherein said sensing means involves a temperature sensor.

3. The power source circuit according to claim 2 wherein the temperature sensor is a platinum temperature detecting resistor so that the converting frequency is continually raised as the ambient temperature drops.

4. The power source circuit according to claim 2 wherein the temperature sensor is a PTC thermistor having switching characteristics for changing the converting frequency when the temperature falls below a predetermined value.

5. The power source circuit according to claim 1, wherein said determination means determines the converting frequency of the AC power according to a value detected by the DC output detection means.

6. The power source circuit according to claim 1, wherein said determination means includes a pulse-width modulation (PWM) controller, maximizing DC output power when said converting frequency increases.

7. The power source circuit according to claim 1, wherein the sensing means is activated responsive to positive temperature characteristics.

8. The power source circuit according to claim 1, wherein the sensing means is activated responsive to negative temperature characteristics.

9. A driving circuit for driving a motor for use upon a change of ambient temperature, comprising:
- oscillation means for providing a control signal that determines a converting frequency of AC power;
- sensing means provided for said oscillation means, having temperature characteristics for adjusting the converting frequency upon a change of ambient temperature;
- determination means for determining the converting frequency of the AC power based on the control signal provided by said oscillation means;
- a transformer coupled to said determination means; and
- means connected to a secondary winding of said transformer for providing DC output power to said motor.

10. The driving circuit according to claim 9, wherein said sensing means involves a temperature sensor.

11. The driving circuit according to claim 9, further comprising:
- DC output detection means, including a temperature sensor, for temperature-dependently detecting the DC output power, and wherein said determination means determines the converting frequency of the AC power according to a value detected by the DC output detection means.

12. The driving circuit according to claim 9, wherein said determination means includes a pulse-width modulation (PWM) controller, maximizing DC output power when said converting frequency increases.

13. A power source circuit for driving a load having temperature dependency with power supplied through power transformer means and limiting the power supplied to the load according to detected values, comprising:
- output current detection means for temperature-dependently detecting an output current supplied to the load;
- output voltage detection means for temperature-dependently detecting an output voltage supplied to the load;
- input current detection means for temperature-dependently detecting an input current supplied to the power source circuit; and
- limit means for limiting the power supplied to the load according to values detected by at least two of said detection means.

14. A method in a DC power source circuit for providing an output power signal with characteristics that follow the temperature characteristics of a load, comprising the steps of:
- providing a control signal from an oscillator circuit that determines a converting frequency to convert a DC signal to an AC signal according to temperature;
- sensing the temperature with a temperature sensor in the oscillator circuit;
- adjusting the converting frequency according to the sensed temperature;
- sensing an output current according to temperature in a current sensing circuit, the current sensing circuit including a temperature sensor, and providing a sensed current control signal;
- sensing an output voltage according to temperature in a voltage sensing circuit, the voltage sensing circuit including a temperature sensor, and providing a sensed voltage control signal;
- determining the converting frequency of the AC power according to the voltage and current control signals provided to a pulse width modulator circuit; and
- outputting the output power signal according to the frequency of the AC power that follows the temperature characteristics of the load.

15. A power source circuit for driving a load having temperature dependency and limiting power supplied to the load according to a detected value, comprising:
- output current detection means for temperature-dependently detecting an output current supplied to the load, said output current detection means including a thermistor having nonlinear positive temperature characteristics; and
- limit means for limiting the power supplied to said load according to said output current detected by said output current detection means.

16. A power source circuit for driving a load having temperature dependency and limiting power supplied to the load according to a detected value, comprising:
- output voltage detection means for temperature-dependently detecting an output voltage supplied to the load, said output voltage detection means including a thermistor having nonlinear negative temperature characteristics; and
- limit means for limiting the power supplied to said load according to said output voltage detected by said output voltage detection means.

17. A power source circuit for supplying DC power to a load comprising:
- a rectifying circuit receiving an input alternating current (AC) signal and outputting a direct current (DC) signal;
- a converter transformer, to which said DC signal is applied, for converting said DC signal applied to said converter transformer into an AC signal according to a frequency at which said applied DC power is switched ON and OFF;
- a control circuit including an oscillation circuit and a pulse width modulation (PWM) controller providing a control signal to switch ON and OFF said DC power applied to said transformer thereby controlling a converting frequency of said AC power;
- means for detecting a change in ambient temperature and for providing said control circuit an indication of said change, said control circuit thereby adjusting said converting frequency according to said change; and
- means connected to a secondary winding of said converter transformer for providing DC output power to said load.

18. A power source circuit as recited in claim 17, further comprising:
- DC output detection means, including a temperature sensor, for temperature-dependently detecting said DC output power and providing a signal to said control circuit indicating said temperature-dependently detected DC output power.

19. A power source circuit as recited in claim 17, wherein said detecting means includes sensing means for said oscillation circuit, having temperature characteristics for increasing the converting frequency upon a decrease of ambient temperature.

* * * * *